United States Patent [19]
Rose et al.

[11] Patent Number: 5,894,791
[45] Date of Patent: Apr. 20, 1999

[54] MACHINE FOR SEPARATING A MATERIAL MIXTURE

[75] Inventors: Wolfgang Rose, Eckhorst; Klaus Ziebell, Lübeck, both of Germany

[73] Assignee: Nordischer Maschinenbau Rud. Baader GmbH & Co KG, Lubeck, Germany

[21] Appl. No.: 08/748,808

[22] Filed: Nov. 15, 1996

[30]    Foreign Application Priority Data

Nov. 18, 1995 [DE] Germany ............... 295 18 810 U

[51] Int. Cl.⁶ .................... B30B 9/20; A22C 17/04
[52] U.S. Cl. ........................ 100/121; 99/495; 100/153; 209/699; 452/198
[58] Field of Search ................. 100/118, 121, 100/153, 156; 99/457, 460, 464, 495; 209/699; 210/386, 401, 402; 452/198

[56]    References Cited

U.S. PATENT DOCUMENTS

| | | | |
|---|---|---|---|
| 1,595,894 | 8/1926 | Klund | 100/153 |
| 2,365,658 | 12/1944 | Schumacher | 100/121 |
| 3,734,000 | 5/1973 | Ziener | |
| 4,206,696 | 6/1980 | Grant et al. | 100/121 |
| 4,819,811 | 4/1989 | Ewing et al. | 209/699 |
| 4,826,595 | 5/1989 | Franke | 100/121 |
| 4,899,890 | 2/1990 | Ewing et al. | 209/699 |
| 5,085,140 | 2/1992 | Kunig | 100/121 |
| 5,103,720 | 4/1992 | Rose et al. | 100/121 |
| 5,241,901 | 9/1993 | Kunig | 100/121 |
| 5,385,244 | 1/1995 | Kunig et al. | 100/153 |
| 5,674,117 | 10/1997 | Kunig et al. | 209/699 |

FOREIGN PATENT DOCUMENTS

| | | |
|---|---|---|
| 0394625 | 10/1990 | European Pat. Off. |
| 4212927 | 10/1993 | Germany |
| 4328627 | 3/1995 | Germany |

*Primary Examiner*—Stephen F. Gerrity
*Attorney, Agent, or Firm*—Fay,Sharpe,Beall,Fagan,Minnich & McKee

[57]    ABSTRACT

A material mixture is separated into components of different flowability using a perforated drum mounted in a housing and supported by a detachable mounted portion. The drum is partially wrapped by a presser belt with is pressed against the drum by an adjustable pressure roller. The housing is formed as a parallelepiped-shaped shaft with a dividing wall to separate the drive section from the service section. The presser belt is guided to form an angle of 20° to 30° with respect to the drum and the drum is driven to have a peripheral speed of two to six percent higher than that of the presser roller.

21 Claims, 4 Drawing Sheets

MACHINE FOR SEPARATING A MATERIAL MIXTURE

BACKGROUND OF THE INVENTION

1. Field of the Invention

The invention concerns a machine for separating a material mixture into components of different flowability, comprising a housing which includes a frame portion to be covered by a rear wall, a floor portion and a top cover, and an add-on or extension portion to be releasably attached to the base or frame portion leaving a space; a rotatable drum with a perforated outer surface arranged in said housing; an endless presser belt arranged to partially wrap said drum and move in the same sense as said drum; adjustable pressing means including at least a roller for pressing said presser belt against said drum; means for driving the perforated drum and/or the presser belt, preferably in the form of a chain drive; and a pull-in zone and a delivery zone formed by the presser belt and the circumferential surface of the drum.

2. Prior Art

Machines of this kind are commonly employed in the food industry and are used, for example, for mincing meat while at the same time removing collagenous tissue or tendons, for producing fish forcemeat which is free of skin and bones, for making fruit or vegetable juices and/or pulp, for recovering the contents of packaging, and for many other purposes. They are also increasingly used in the recycling industry.

They function so that the product being processed is fed into the pull-in zone and is there drawn in between the perforated drum and presser belt. The flowable components are then extruded through the perforations in the drum into its interior under the influence of the belt pressure while the less flowable components remain on the outer surface of the drum and are finally removed, preferably by scraping with a scraping device, at a delivery zone.

The presser belt is normally guided by means of a pressure roller, a tension roller and/or a deflection roller. As a rule, the pressure roller also serves as the driving roller for the presser belt. The presser belt is guided between front and rear walls which house the rollers as well as the perforated drum. The open end of the perforated drum extends through the front wall and is borne there by support rollers, which hold the drum above a bearing surface, provided specifically for this purpose.

The basic arrangement and functional parts of such a separating machine having a perforated drum are shown for example in the reference DE 4328627 while the structural principle of such a machine is shown in EP 0394625.

The use of such a separator machine especially in the food industry imposes high requirements in many respects. The hygiene requirements are inter alia of particular import. The apparatus of this kind must therefore allow easy and thorough cleaning, which requires not only a compact construction but also and especially rapid and easy access to the functional parts which are necessary in practically all fields of application. The presser belt, or rather its attrition is also critical, since the rubbed-off parts will inevitably land in the product and impair the quality thereof. Furthermore, problems will always occur when the product to be processed contains large lumps, since it is difficult to distribute the product uniformly over the pressing area surface which easily leads to leaks and poor processing results.

3. Objects of the Invention

It is the primary object of the invention to suggest a machine which, when either taken as a whole or by combination of several of its structural components overcomes the prior art deficiencies. It is a particular object of the invention to improve the arrangement and operation of at least part of the different machine component parts mentioned above by suggesting a machine which by virtue of a coaction of those component parts operates substantially more effectively. It is a further object of the invention to thus improve the manageability of such machine or at least its essential functional component parts.

SUMMARY OF THE INVENTION

In a machine for separating a material mixture into components of different flowability, comprising a housing, which comprises a frame portion to be covered by a rear wall, a floor portion and a top cover, and an add-on portion to be releasably attached to the base or frame portion leaving a space; a rotatable drum with a perforated outer surface arranged in said housing; an endless presser belt arranged to partially wrap said drum and move in the same sense as said drum; adjustable pressing means including at least a roller for pressing said presser belt against said drum; means for driving the perforated drum and/or the presser belt, preferably in the form of a chain drive; and a pull-in zone and a delivery zone formed by the presser belt and the circumferential surface of the drum, these objects are achieved at least to a substantial extent by at least one of the following features, in that

- the base portion is formed as an essentially parallelepipid-shaped carrying shaft or well with a detachable rear wall, a dividing wall being arranged in said base portion and serving as a rear mounting wall also dividing a drive area from a service area and said service area being closed by said rear wall;
- various feed devices are arrangable above said add-on portion;
- bearing means for the drum are arranged in a front wall and a dividing wall of the housing, the free end of the drum being supported by said add-on portion attached to and spaced from said front wall;
- the perforations in said drum outer surface are formed by holes arranged in rows inclined at an acute angle to the axial direction of said drum, the holes of adjacent rows being mutually offset such that they describe a helical path in the circumferential direction;
- the drum (surface-) is hardened, preferably full-hardened;
- in said pull-in zone, the presser belt is arranged at an angle of between 20° and 30° to the outer drum surface;
- the pressing means comprise at least one presser roller mounted on an eccentric shaft, the eccentric shaft being mounted in said dividing wall and said add-on portion;
- it comprises tension adjustment means for adjusting the tension of said presser belt, said adjustment means comprising an adjustable tension roller adapted to guide said presser belt;
- said drive means comprise a single common driving chain for driving said drum and said presser belt;
- the driving means for the drum imparts a peripheral speed which is 2 to 6 percent higher than that of said presser roller; and
- it comprises guiding means arranged in the area of contact between said drum and said presser belt on the side of the belt directed away from the material to be processed.

With the above construction of the base portion, there is achieved on the one hand the desired compact arrangement of the machine and on the other hand a clear separation between the working, drive and service areas with the advantageous possibility of servicing these areas individually. Thus, the product to be processed remains totally unaffected by the various operating substances such as oil and grease.

Means for receiving and/or connecting various feed devices can particularly advantageously be provided above the add-on portion, so that the applications of the apparatus are not restricted to specific predetermined feeding means, but can be extraordinarily varied. It is thus possible that e.g. the arrangement may be fed manually, or be arranged downstream of an existing conveyor system. Structurally, a further improvement and simplification is achieved when the means for receiving and/or connecting various feed devices comprise the upper surface or cover of the base portion.

The add-on portion can furthermore be incorporated usefully into the whole structural design of the machine by providing it with support means serving as counter bearings for the drum which, as mentioned above, is mounted as a cantilever in the base portion by means of the bearings in the front and dividing wall. These support means may be rollers, which engage with corresponding counter supports on the perforated drum in the form of a ring or annular bearing or the like. This provides the advantage that, after removal of the front wall and the ring bearing, the presser belt need surmount only one collar on removal, this collar being dimensioned merely to serve as an inner abutment element for the ring bearing, which is subjected to only minimal axial forces. Thus the collar need be dimensioned exclusively to satisfy the requirements for a leakproof join with the presser belt.

This ring bearing may be fixed to prevent its axial and rotational movement with respect to the drum, the axial movement preferably being prevented by the provision of retention means, which lock into the drum outer surface in a securing position. To enable rapid and efficatious mounting and dismounting, the retention means for preventing axial and rotational movement can be formed as radially displaceable catches. A similar object is achieved when the seat between the outer drum surface and the ring bearing is formed as a stepped cylinder. The perforated drum may as well comprise a base which is provided on its outer surface with radial grooves to enable the connection with the drive means.

The perforated drum must be capable of withstanding high forces in operation due to both the pressure applied by the presser belt and also the wearing affect of a scraping apparatus forming part of the prior art and will not be described in detail here. It is thus preferable that the perforations in the drum outer surface be arranged in rows extending roughly in the axial direction of the perforated drum but at an acute angle to the drum axis, and that the holes of adjacent rows be mutually offset such that they describe a helix around the periphery of the outer drum surface. This contributes to the reduction in wear at the scraping apparatus, as does the advantageous feature of hardening, and preferably fully hardening, over its total thickness the perforated drum which is preferably and usefully fabricated by casting. In order for the machine to operate faultlessly, it is necessary that the holes in the outer drum surface have clean edges, and that these edges be preserved during operation so that the scraping apparatus is able to provide the cropping action necessary for efficatious scraping over a long term. To achieve this purpose and also especially to keep the wear of the expensive perforated drum within acceptable limits, the scraping blade held against the drum outer surface is normally fabricated from a material with an improved sliding behaviour, whereby the wear is transferred to this element. However, with the quality of the drum proposed according to the invention, the scraping blade may also be hardened and so ensure a higher efficiency and longer lifetime.

Studies have shown that the given angles of inclination and wrap result in an optimum throughput and yield. The angles of inclination are smaller than is generally known from the prior art resulting in more favourable conveying and pull-in conditions. There is also a reduction in the wear of the presser belt with the above-mentioned relative peripheral speeds of the perforated drum and the presser roller.

A further contributing factor is also particularly provided by the pressure means in the form of a presser roller or rollers mounted on an eccentric shaft. The eccentric shaft is preferably associated with an adjustment mechanism while the adjustment mechanism and eccentric shaft can be mutually resiliently connected.

In order for the adjustment mechanism to have a simple structure and be easy to operate and manage it may comprise an adjustment spindle arranged transverse to the eccentric shaft and having a spindle nut provided with a link bracket which in turn is in contact with a resilient element, whereby the free end of a pivotal lever which is attached to the eccentric shaft such that it cannot rotate positively engages with the link bracket. The resilient element in the adjustment mechanism acts as a pressure limiter so that when the pressure applied by the presser roller threatens to exceed that which is set, the presser roller may yield. For constructional reasons, the resilient element may be formed of disk springs which are adjustable with respect to the initial bias load.

In a further measure to reduce the wear of the presser belt, and also to allow the machine to adapt rapidly to varying operating conditions, the machine may comprise belt-tension adjustment means in the form of a tension roller which also guides the presser belt. The tension roller may also be mounted on an eccentric axis to facilitate adjustment.

The specific above described arrangement of the drive means using a single common chain leads to important structural simplifications. The chain may be driven by an angular gear drive mounted at the floor portion of the machine in the drive area, which results in an especially compact arrangement of the elements and thus reduces the overall volume required by the machine.

The claimed guiding means serve to distribute the material to be processed as evenly as possible over the entire pressing cross-section, which is particularly important when coarse material comprising large lumps is fed to the machine, and also ensure that no leaks are formed. To promote the progressive pulling-in of material, the guiding means may comprise runners having a supporting contour which extends such that the presser belt progressively approaches the contour in its direction of movement. This can be particularly efficatiously achieved by forming the guiding means as a pair of runners arranged at the edges of the presser belt between which is arranged at least one support roller. The highest point of the support roller should lie flush with the runner contour lying in its extension. Preferably, the guiding means are radially adjustable with respect to the perforated drum, and the adjustment can be effected by means of eccentric bearings, which ensures easy operation as well as providing a simple construction.

BRIEF DESCRIPTION OF THE DRAWINGS

Further objects of the present invention will be apparent from the following description and claims and are illustrated in the accompanying drawings which schematically show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

DESCRIPTION OF THE PREFERRED EMBODIMENTS

Figure 1:
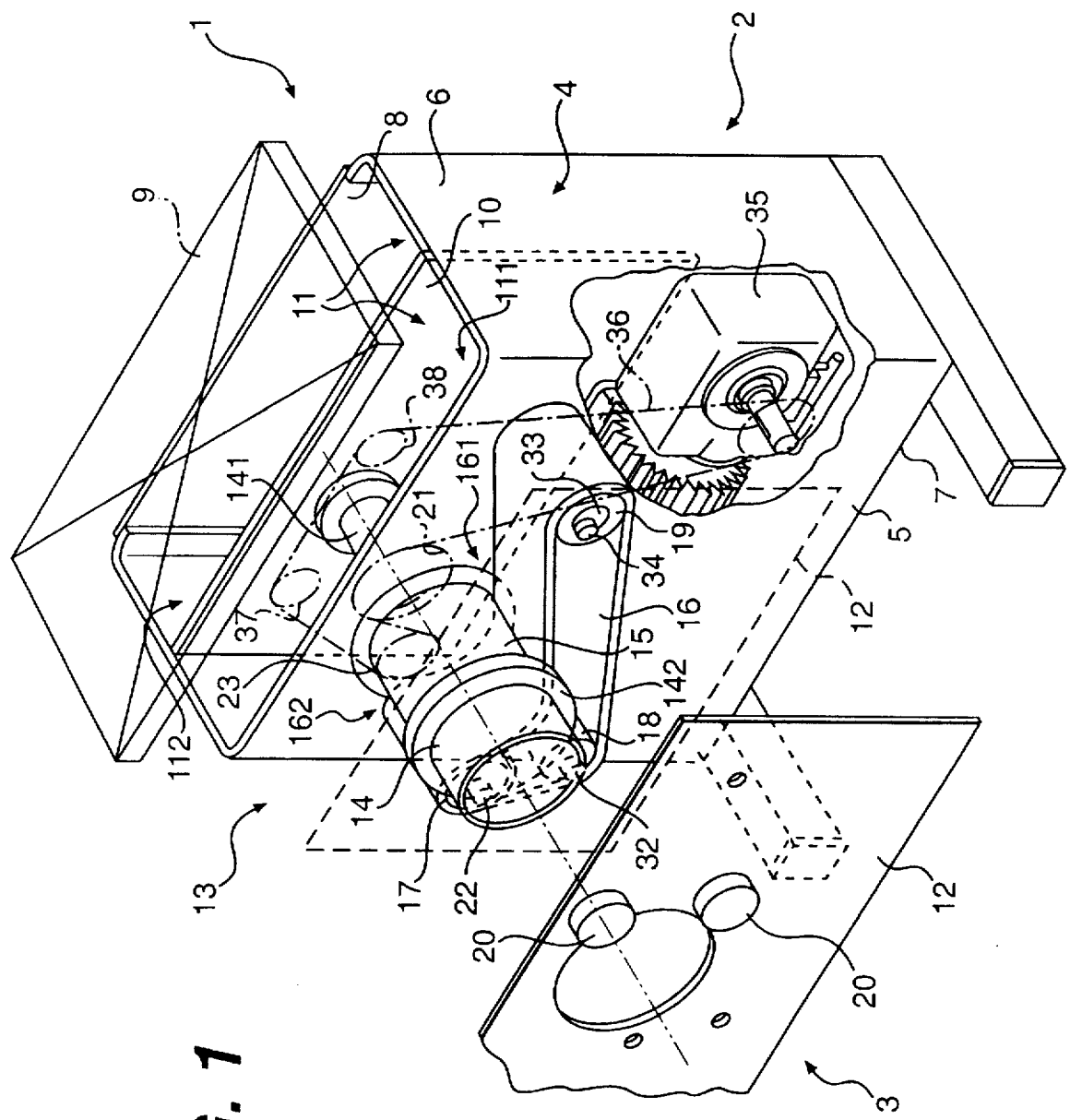
FIG. 1 is an overall perspective view of the apparatus with the front plate and cover moved away to reveal the essential components and add-on parts.

The separator machine according to the invention comprises a housing 1, which includes a base portion 2 and an extension or add-on portion 3. The base portion 2 is formed by a housing casing 4 which consists of a sheet bent into a U-shape to comprise a front wall 5 and two side walls 6 which stand on a floor or bottom portion 7 and define a parallelepiped-shaped well or shaft 11. The rear side is closed by a rear wall 8 and the upper opening is closed by a cover 9. The side walls 6 are connected to one another by a dividing wall 10 which divides the shaft 11 into a drive section 111 and a service section 112 and extends parallel to the front wall 5.

The extension or add-on portion 3 includes a front plate 12 which is level on its inner side and can be mounted in parallel with, but spaced from, the base portion 2 so that a functional space 13 is created between the front wall 5 and the front plate 12. The functional parts are arranged in this functional space. They include a perforated drum 14, open on one side and having a perforated outer drum surface 15, and an endless presser belt 16, which is wrapped around a portion of the perforated drum periphery with a wrap angle between the belt and drum in a range of between 85° and 100°. This forms a pull-in zone 161 and a delivery zone 162. To this end, the presser belt 16 is guided by a pressure roller 17, a deflection roller 18 and a tension roller 19.

The perforated drum 14 is mounted in the front wall 5 and the dividing wall 10 such that its open end extends through the front plate 12, where it is supported by two bearings 20, which roll on a bearing ring 142. The bearing ring 142 may be permanently or releasably connected to the drum outer surface 15. In the case of the releasable arrangement (FIG. 6), the bearing ring is secured to the outer drum surface 15 by means of radially adjustable catches 143 which are attached to the bearing ring. To facilitate the dismounting of the bearing ring 142, the seat 144 between the outer drum surface 15 and the bearing ring 142 is formed as a stepped cylinder. A bearing shaft 141 of the perforated drum 14 is situated between the dividing wall 10 and the front wall 5, i.e. in the drive space. A drive sprocket 21 for driving the perforated drum 14 is attached to this bearing shaft 141. The base 145 of the perforated drum is releasably connected to the bearing shaft 141, for example by means of a non-shown central holding nut, radial grooves 146 located in the base of the drum 145 engaging with complementary protrusions or entrainer elements on the bearing shaft.

In the region above the functional space 13 there is provided non-shown means for receiving the material to be processed and/or for connecting various feed devices.

Figure 3:
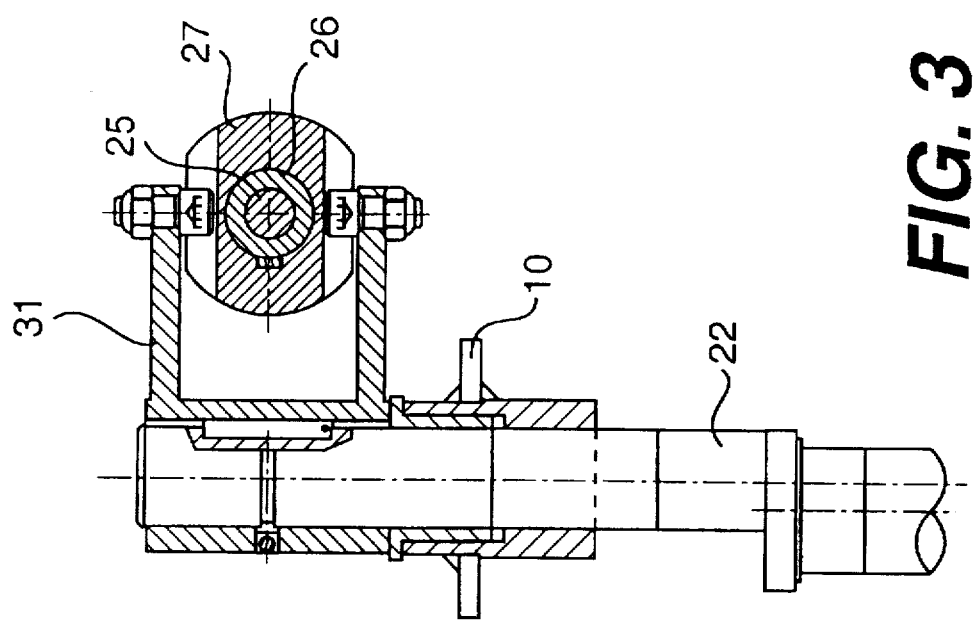
FIG. 3 shows a cross-sectional view of the adjustment device through the line III—III in FIG. 2.
Figure 2:
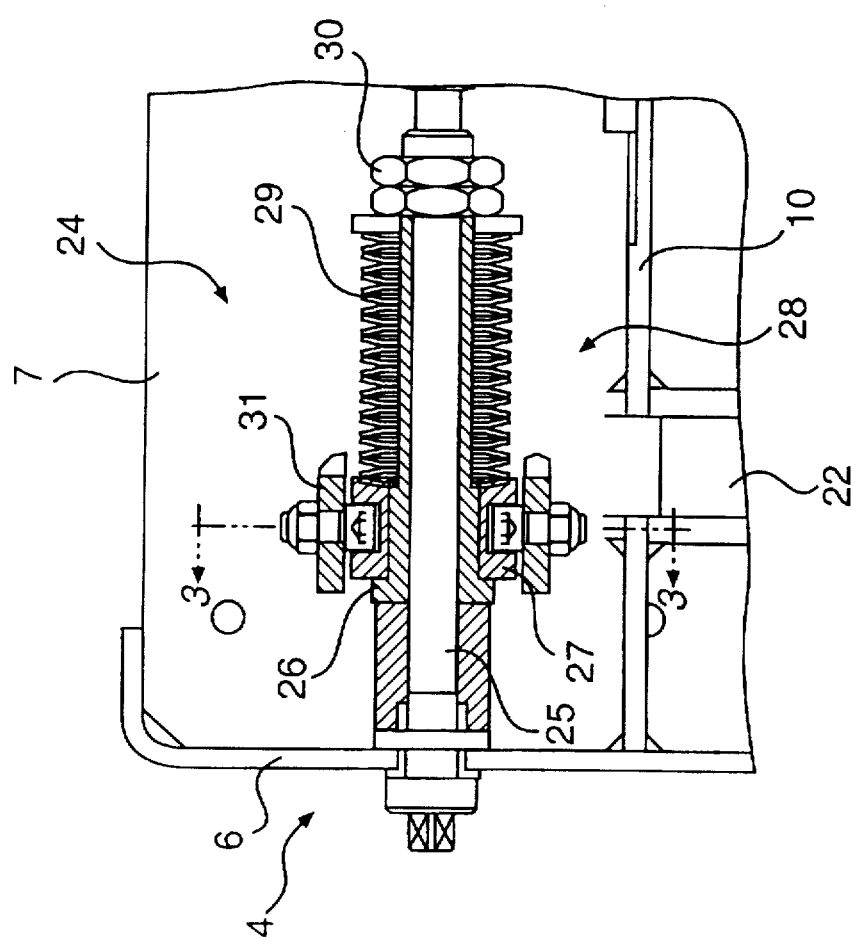
FIG. 2 shows a partial top view of the machine housing with the adjustment device for the presser roller shown in partial longitudinal section.

The pressure roller 17 is mounted on an eccentric shaft 22, which in turn is mounted in the dividing wall 10 and front plate 12. The pressure roller 17 is provided with a driving sprocket 23, which is arranged between the front and dividing walls 5, 10, and therefore also in the drive section 111. The pressure roller 17 may be radially adjusted with respect to the perforated drum 14 by turning the eccentric shaft 22 to allow the presser belt 16 to apply more or less pressure to the outer drum surface 15. The eccentric shaft 22 is turned by means of an adjustment mechanism 24 (FIG. 2 and 3) having an adjustment spindle 25 arranged transverse to the eccentric shaft 22 and turnable by means of a non-shown hand crank, and a spindle nut 26. The spindle nut 26 is formed as a threaded flange sleeve and carries a link bracket 27, which is held against the flange of the flange sleeve by means of a spring element 28 composed of disk springs. The length of the spring element 28, and thus also the extent of the spring force can be adjusted by locknuts 30. A forked pivot lever 31 which is attached to the eccentric shaft in such a way that it cannot rotate, engages with the link bracket.

The deflection roller 18 and the tension roller 19 are mounted on stationary axles 32, 33, respectively, which are supported on the front wall 5 and the front plate 12. The stationary axle 33 is formed as an eccentric axle 34 which is turnable by means of a non-shown adjustment mechanism similar to that described above with reference to 24 but without a spring element, or by means of a hand lever which is also not shown.

The perforated drum 14 and the pressure roller 17 are driven by means of an angular gear motor 35, secured on the bottom part 7 below the dividing wall 10, and via a single endless chain 36, which links the driving sprockets 21 of the perforated drum 14 and 23 and the pressure roller 17 to the driving motor, the chain 36 being guided by a deflection sprocket 37 and a tension sprocket 38.

Figure 4:
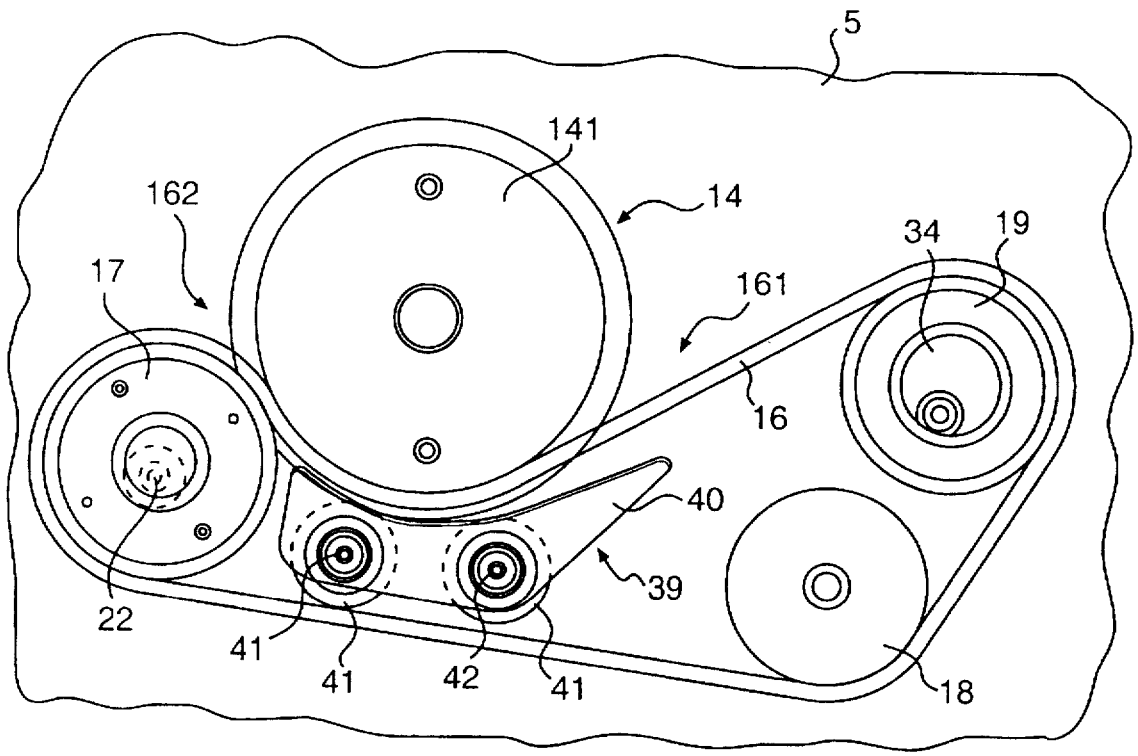
FIG. 4 shows a side view into the functional area with the front plate removed.
Figure 5:
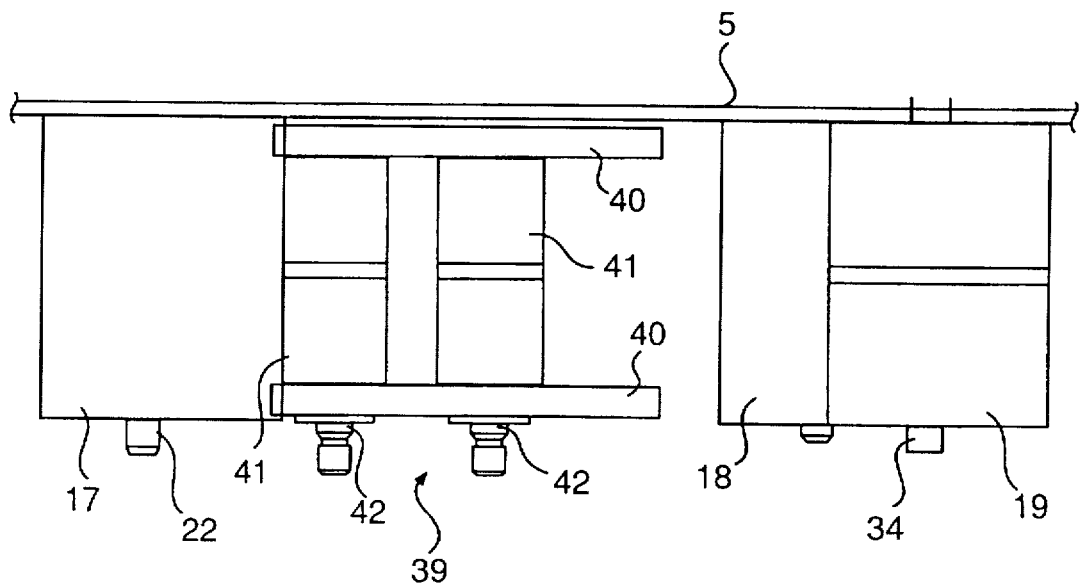
FIG. 5 shows a top view of FIG. 4 without the presser belt and perforated drum.
Figure 8:
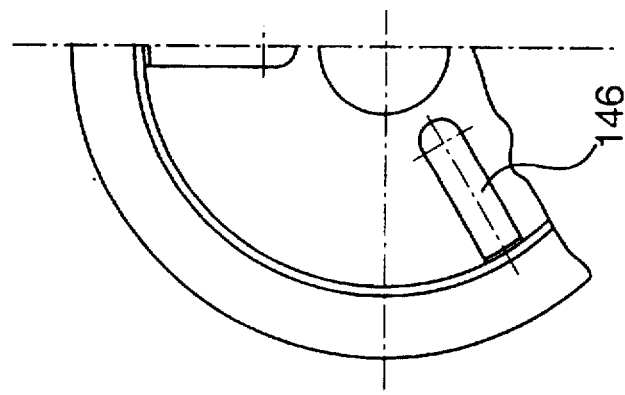
FIG. 8 shows a partial front view of the perforated drum viewed from below.
Figure 7:
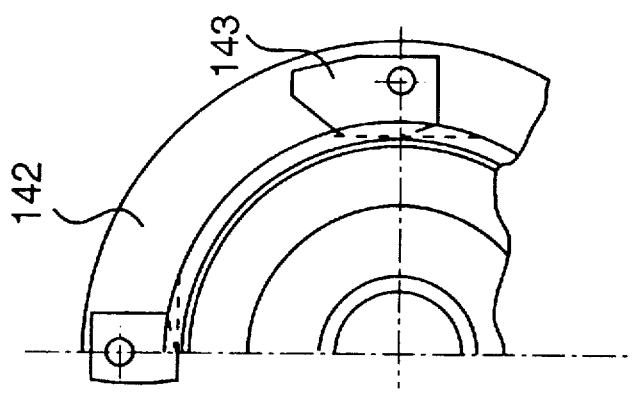
FIG. 7 shows a partial front view of the perforated drum, viewed from its open end.

As shown in FIGS. 4 and 5, guiding means 39 are arranged in the region of contact between the perforated drum 14 and presser belt 16 on the side of the belt directed away from the material to be processed. These guiding means 39 comprise a pair of runners 40 arranged at the edges of the belt 16 and between which are arranged two support rollers 41. On the surfaces of the runners opposing the presser belt 16 the runners comprise a support contour which extend in a manner to progressively approach the belt in its direction of movement. The support rollers 41 are associated with the runners 40 in such a way that the surface of the support rollers opposing the outer drum surface 15 most closely lie flush with the support contour of the runners. The runners and support rollers are mounted on stationary axles 42, which are supported on the front wall 5 and the front plate 12. The guiding means 39 can be radially adjustable with respect to the perforated drum 14 by means of suitable non-shown eccentric bearings.

In order to prepare the separator apparatus for operation, the parts which have been dismounted for cleaning for example must be mounted. To this end, the deflection roller 18 and the tension roller 19 are first placed onto the stationary axes 32 and 33, the eccentric axis 34 of the tension roller 19 and the eccentric shaft 22 of the pressure roller 17 being both in a relaxed position from the previous dismounting. The presser belt 16 is then slipped onto the mounted rollers 17, 18, 19 and the front plate 12 mounted and secured to the front wall 5 of the base portion 2 with non-shown spacer bolts. The separator machine can then be completed by mounting the perforated drum 14, which is inserted through the front plate 12 causing the presser belt 16 to be pushed out of way. After insertion, the perforated drum 14 is screwed to its bearing shaft 141 such that the two turn together. The presser belt 16 can then be tensioned by turning the eccentric axis 34 of the tension roller 19, and the separator apparatus turned on. The desired pressure to be applied by the pressure roller is only then adjusted—this is not performed before the machine is in motion so as to protect the presser belt 16 from excessive strain—and the material to be processed can then be fed to the presser belt 16, from where it is transported into the pull-in zone 161 and thus between the drum outer surface 15 and the presser belt.

The separated material which arrives inside the perforated drum 14 is extracted by means of a non-shown stationary delivery worm while that material component remaining between the presser belt 16 and the drum outer surface 15 and consisting of less or non-flowable components is scraped from the drum surface in the region of the delivery zone 162 by an also non-shown scraping apparatus and ejected.

As may be seen particularly from FIG. 4, the angle of wrap of the presser belt 16 around the perforated drum 14 lies in the range of between 100° to 120°, while the angle of inclination of the presser belt with respect to the horizontal lies in the range of 20° to 30°.

Figure 6:
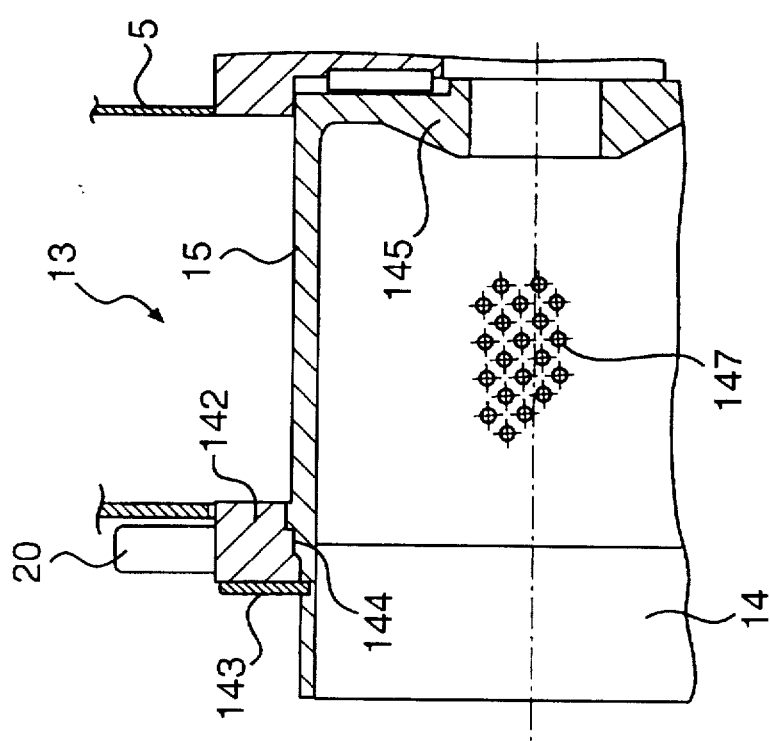
FIG. 6 shows a partial longitudinal section through the perforated drum and its bearing.

The perforated drum 14 shown in FIG. 6 has perforations 147 arranged in rows. These rows extend rectilinearly in the longitudinal direction of the drum at an acute angle of a few degrees to the axial direction. The holes are arranged offset relative to one another around the periphery of the drum such that they describe a helix.

We claim:

1. A machine for separating a material mixture into components of different flowability, comprising A a housing, comprising
  A1 a base portion, as well as a rear wall, a floor portion and a cover for closing said base portion from the back, bottom and top, respectively, and
  A2 a mounted portion releasably attached to the base portion and separated from said base portion by a space;
 B a rotatable drum with a perforated outer surface arranged in said housing;
 C an endless presser belt arranged to partially wrap said drum and to move in the same sense as said drum;
 D adjustable pressing means including at least a roller for pressing said presser belt against said drum;
 E drive means for the drum and/or the presser belt in the form of a chain drive and
 F a pull-in zone and a delivery zone formed by the presser belt and the drum outer surface,
wherein
 G said base portion is formed as an essentially parallelepipid-shaped carrying shaft with said rear wall arranged to be detachable, a dividing wall is arranged in said base portion and serves as a rear mounting wall for dividing a drive section from a service section and said service section being closed by said rear wall;
 H bearing means for said drum are provided in a front wall and said dividing wall of said housing, the free end of said drum being supported by an add-on portion attached to and spaced from said front wall;
 I said perforations in said drum outer surface are formed by holes arranged in rows inclined at an acute angle to the axial direction of said drum, the holes of adjacent rows being mutually offset such that they describe a helical path in the circumferential direction;
 J said drum is one-surface-hardened and full-hardened;
 K said presser belt is arranged in said pull-in zone at an angle of between 20° and 30° to the outer drum surface;
 L said pressing means comprises at least a pressure roller mounted on an eccentric shaft, which is mounted in said dividing wall and said add-on portion;
 M tension adjustment means is provided for adjusting the tension of said presser belt, which comprises an adjustable tension roller adapted to guide said presser belt;
 N said drive means comprises a single common driving chain for driving said drum and said presser belt;
 P the driving means for said drum imparts a peripheral speed which is 2 to 6 percent higher than that of said pressure roller; and
 Q guiding means are arranged in the area of contact between said drum and said presser belt on the side of said belt directed away from said material to be processed.

2. A machine for separating a material mixture into components of different flowability, comprising A a housing, comprising
  A1 a base portion, as well as a rear wall, a floor portion and a cover for closing said base portion from the back, bottom and top, respectively, and
  A2 an add-on portion releasably attached to the base portion and separated from said base portion by a space;
 B a rotatable drum with a perforated outer surface arranged in said housing;
 C an endless presser belt arranged to partially wrap said drum and move in the same sense as said drum;
 D adjustable pressing means including at least a roller for pressing said presser belt against said drum;
 E drive means for the drum and/or the presser belt in the form of a chain drive and
 F a pull-in zone and a delivery zone formed by the presser belt and the drum outer surface,
wherein
 G said base portion is formed as an essentially parallelepipid-shaped carrying shaft with said rear wall arranged to be detachable, a dividing wall is arranged in said base portion and serves as a rear mounting wall for dividing a drive section from a service section and said service section being closed by said rear wall.

3. A machine as claimed in claim 2, wherein said add-on portion comprises a front plate with an essentially plain inner face arranged parallel to the front wall of said base portion, said front plate defining a functional section, in which are located said pull-in zone and said delivery zone.

4. A machine as claimed in claim 2, wherein said drum is mounted as a cantilever in said base portion and said add-on portion comprises support means serving as bearings for said drum.

5. A machine for separating a material mixture into components of different flowability, comprising
- A a housing, comprising
  - A1 a base portion, as well as a rear wall, a floor portion and a cover for closing said base portion from the back, bottom and top, respectively, and
  - A2 an add-on portion releasably attached to the base portion and separated from said base portion by a space;
- B a rotatable drum with a perforated outer surface arranged in said housing;
- C an endless presser belt arranged to partially wrap said drum and move in the same sense as said drum;
- D adjustable pressing means including at least a roller for pressing said presser belt against said drum;
- E drive means for the drum and/or the presser belt in the form of a chain drive and
- F a pull-in zone and a delivery zone formed by the presser belt and the drum outer surface, wherein
- G bearing means for said drum are provided in a front wall and a dividing wall of said housing for dividing a drive section from a service section, a free end of said drum being supported by said add-on portion which is attached to and spaced from said front wall.

6. A machine as claimed in claim 5, wherein said add-on portion comprises support means including rollers for supporting said drum, and said drum comprises complementary bearing means including a bearing ring.

7. A machine as claimed in claim 6, wherein said bearing ring is detachably connected to said drum outer surface.

8. A machine as claimed in claim 6, wherein said bearing ring comprises retention means in the form of radially displaceable catches, which are adapted to engage said drum outer surface in a securing position to prevent axial and rotational movement of said bearing ring relative to said drum.

9. A machine as claimed in claim 6, wherein a seat in the shape of a stepped cylinder is formed between said drum outer surface and said bearing ring.

10. A machine as claimed in claim 5, wherein the perforations in said drum outer surface are formed by holes arranged in rows inclined at an acute angle to the axial direction of said drum, the holes of adjacent rows being mutually offset to describe a helical path in the circumferential direction.

11. A machine as claimed in claim 5, wherein said drum is one-surface-hardened or full-hardened.

12. A machine for separating a material mixture into components of different flowability, comprising
- A a housing, comprising
  - A1 a base portion, as well as a rear wall, a floor portion and a cover for closing said base portion from the back, bottom and top, respectively, and
  - A2 an add-on portion releasably attached to the base portion and separated from said base portion by a space;
- B a rotatable drum with a perforated outer surface arranged in said housing;
- C an endless presser belt arranged to partially wrap said drum and move in the same sense as said drum;
- D adjustable pressing means including at least a roller for pressing said presser belt against said drum;
- E drive means for the drum and/or the presser belt in the form of a chain drive and
- F a pull-in zone and a delivery zone formed by the presser belt and the drum outer surface, wherein
- G1 an angle of wrap between said presser belt and said drum lies in the range of between 85° and 100° and
- G2 said presser belt is inclined at an angle of between 20° and 30° to said outer drum surface in said pull-in zone.

13. A machine for separating a material mixture into components of different flowability, comprising
- A a housing, comprising
  - A1 a base portion, as well as a rear wall, a floor portion and a cover for closing said base portion from the back, bottom and top, respectively, and
  - A2 an add-on portion releasably attached to the base portion and separated from said base portion by a space;
- B a rotatable drum with a perforated outer surface arranged in said housing;
- C an endless presser belt arranged to partially wrap said drum and move in the same sense as said drum;
- D adjustable pressing means including at least a roller for pressing said presser belt against said drum;
- E drive means for the drum and/or the presser belt in the form of a chain drive and
- F a pull-in zone and a delivery zone formed by the presser belt and the drum outer surface, wherein
- G said pressing means comprises at least a pressure roller mounted on an eccentric shaft, which is mounted in said dividing wall and said add-on portion.

14. A machine as claimed in claim 13, wherein said eccentric shaft is connected to an adjustment mechanism in a resiliently yielding manner.

15. A machine as claimed in claim 14, wherein said adjustment mechanism comprises an adjustment spindle with a spindle nut, said spindle extending transversely with respect to said eccentric shaft and said spindle nut comprising a link bracket which supports a resilient element, and including a pivot lever which is connected to rotate with said eccentric shaft and positively engages in said link bracket.

16. A machine for separating a material mixture into components of different flowability, comprising
- A a housing, comprising
  - A1 a base portion, as well as a rear wall, a floor portion and a cover for closing said base portion from the back, bottom and top, respectively, and
  - A2 an add-on portion releasably attached to the base portion and separated from said base portion by a space;
- B a rotatable drum with a perforated outer surface arranged in said housing;
- C an endless presser belt arranged to partially wrap said drum and move in the same sense as said drum;
- D adjustable pressing means including at least a roller for pressing said presser belt against said drum;
- E drive means for the drum and/or the presser belt in the form of a chain drive and
- F a pull-in zone and a delivery zone formed by the presser belt and the drum outer surface, wherein
- G said drive means comprise a single common driving chain for driving said drum and said presser belt.

17. A machine as claimed in claim 16, further including an angular gear motor arranged in a driving section mounted on said floor portion of said housing for driving said chain.

18. A machine for separating a material mixture into components of different flowability, comprising A a housing, comprising
- A1 a base portion, as well as a rear wall, a floor portion and a cover for closing said base portion from the back, bottom and top, respectively, and
- A2 an add-on portion releasably attached to the base portion and separated from said base portion by a space;

B a rotatable drum with a perforated outer surface arranged in said housing;

C an endless presser belt arranged to partially wrap said drum and move in the same sense as said drum;

D adjustable pressing means including at least a roller for pressing said presser belt against said drum;

E drive means for the drum and/or the presser belt in the form of a chain drive and F a pull-in zone and a delivery zone formed by the presser belt and the drum outer surface, wherein G said driving means imparts to said drum a peripheral speed which is 2 to 6 percent higher than a speed of said pressure roller.

19. A machine for separating a material mixture into components of different flowability, comprising A a housing, comprising
- A1 a base portion, as well as a rear wall, a floor portion and a cover for closing said base portion from the back, bottom and top, respectively, and
- A2 an add-on portion releasably attached to the base portion and separated from said base portion by a space;

B a rotatable drum with a perforated outer surface arranged in said housing;

C an endless presser belt arranged to partially wrap said drum and move in the same sense as said drum;

D adjustable pressing means including at least a roller for pressing said presser belt against said drum;

E drive means for the drum and/or the presser belt in the form of a chain drive and F a pull-in zone and a delivery zone formed by the presser belt and the drum outer surface, wherein G guiding means are arranged in the area of contact between said drum and said presser belt on the side of the belt directed away from said material to be processed.

20. A machine as claimed in claim 19, wherein said guiding means comprise a pair of runners arranged adjacent the edges of said presser belt and wherein at least one support roller is arranged between said runners.

21. A machine as claimed in claim 20, wherein said guiding means are arranged to be radially adjustable with respect to said drum.

* * * * *